UNITED STATES PATENT OFFICE.

ALPHEUS C. DUNN, OF NEW YORK, N. Y.

IMPROVED COMPOSITION FOR LINING BARRELS.

Specification forming part of Letters Patent No. 55,073, dated May 29, 1866.

*To all whom it may concern:*

Be it known that I, ALPHEUS C. DUNN, of 131 West Eighteenth street, in the city, county, and State of New York, have invented a new Composition for Coating the Interiors of Barrels for containing petroleum, turpentine, benzine, naphtha, alcohol, and other liquids of similar penetrating character; and I do hereby declare that the following is a full, clear, and exact description of the component parts of and modes of compounding and using the same.

My invention consists in a composition of gum-copal, linseed-oil, and alkali, either with or without glue.

For coating barrels for containing alcohol I take about three (3) parts, by weight, of gum-copal, melt it by subjecting it to a suitable heat—say about 750° Fahrenheit—and while in the melted state add about eight similar parts, by weight, of the boiled linseed-oil used by painters, and stir till this mixture has cooled sufficiently to allow an aqueous solution to be added to it. I then add of an aqueous solution of potash or soda of the strength of 3° Baumé a quantity equal to about one sixteenth ($\frac{1}{16}$) part of the weight of the mixture of gum-copal and linseed-oil, and stir the whole together till thoroughly mixed.

The barrels are coated with this compound by heating it to nearly a boiling temperature and pouring about two gallons through the bung-hole of each barrel of ordinary size, putting in the bung, and rolling the barrel over in all directions till every part of the interior is thoroughly covered, when the bung may be removed and the surplus composition, if there be any, is poured out. As soon as the composition is dry the barrel is ready for use, and is impervious to alcohol.

For coating barrels for containing petroleum I take the mixture of three (3) parts, by weight, of gum-copal, and eight (8) similar parts of boiled linseed-oil, mixed as hereinabove described, and add of the aqueous solution of potash or soda hereinabove specified, in a boiling state, a quantity about equal in weight to twice the whole weight of the gum-copal and boiled linseed-oil. I also take of glue about the same quantity as above specified of gum-copal—viz., three (3) parts by weight—and boil it in about thirty-two (32) similar parts, by weight, of the above-specified aqueous solution of potash or soda. I then mix this quantity of alkaline solution of glue with the above-mentioned quantity of the mixture of gum-copal, boiled linseed-oil, and solution of soda or pot-ash while the two solutions are at a boiling, or nearly boiling, temperature, and while at such temperature I apply the compound solution to the barrels in the same manner as above directed for the alcohol-barrels.

The composition prepared as last described may be applied successfully to barrels which have contained crude petroleum, to prepare them for the reception of the refined oil, which may be stored in barrels so prepared without being at all deteriorated. It may also be applied with advantage to barrels which have been prepared by the process of Louis S. Robbins, patented May 3, 1864, the preparation by such process contributing to the successful action of my composition.

I do not limit myself to the proportions herein specified of the several ingredients used in my composition, as these proportions may be varied in some degree without materially impairing its efficiency; but I have specified the proportions which, all things considered, I believe to be the best.

What I claim as my invention, and desire to secure by Letters Patent, is—

A composition, substantially as herein described, of gum-copal, boiled linseed-oil, and an aqueous solution of soda or potash, either with or without glue.

ALPHEUS C. DUNN.

Witnesses:
HENRY T. BROWN,
ELLIS D. LAZELL.